UNITED STATES PATENT OFFICE.

JOHN WOODS BECKMAN, OF NIAGARA FALLS, ONTARIO, CANADA.

METHOD OF PRODUCING METAL SALTS AND METALS.

973,336. Specification of Letters Patent. Patented Oct. 18, 1910.

No Drawing. Application filed May 7, 1910. Serial No. 559,969.

*To all whom it may concern:*

Be it known that I, JOHN WOODS BECKMAN, a resident of Niagara Falls, Ontario, Canada, have invented a new and useful Method of Producing Metal Salts and Metals, of which the following is a full, clear, and exact description.

My invention has relation to a novel method of producing metal salts, and also for obtaining metals from such salts, and is designed to provide a novel, simple and efficient method, whereby substantially pure metals may be obtained from impure oxids thereof.

My invention is applicable to the treatment of various metals, such as iron, aluminum, chromium, titanium, tungsten, molybdenum, manganese and silicon, and in fact, to any metal whose oxid will form a salt with calcium.

In carrying out my invention, I mix the oxid of the metal with calcium oxid in a suitable electric furnace, capable of developing sufficient heat to cause the formation of a calcium salt of the metal. Thus, in the case of iron, the reaction would be represented by the following equation:

$$CaO + Fe_2O_3 = CaOFe_2O_3$$

provided it is desired to produce a monobasic calcium salt of iron. For a dibasic, tribasic, or $n$-basic salt, the proportions of the calcium oxid and iron oxid will be varied accordingly. It is possible, however, that the calcium may combine with a greater quantity of iron oxid, forming a salt containing a greater percentage of iron than calcium ferrite, this being a matter which at the present time can not be readily determined by chemical investigation. The calcium salt of the metal thus produced may be used for any desired purpose, but is employed by me to obtain a substantially pure metal therefrom in the following manner: The salt formed as above described is maintained in a state of fusion in the electric furnace by passing current through it, and a further quantity of oxid of the metal is added to the bath. The bath is electrolyzed, causing the metal to be precipitated. Thus, in the treatment of iron, the iron oxid ($Fe_2O_3$) is decomposed to produce metallic iron and oxygen in accordance with the following equation:

$$Fe_2O_3 = 2Fe + 3O$$

the iron going to the negative pole and the oxygen to the positive pole. The fused $CaOFe_2O_3$ acts as a vehicle for the $Fe_2O_3$ in the reaction, and also as the resistant to the heating current, by which the salt is maintained in a fused condition. It is possible and probable, however, that more or less decomposition and reformation of the calcium salt may take place.

Either direct or alternating current may be used to maintain the bath in a state of fusion, while direct current is used for the electrolysis. The voltage of electrolyzing current should be regulated to suit the particular metal to be precipitated, higher voltages being required for some metals than for others, depending upon their heat of formation. This, however, is a matter which the metallurgist can readily determine. A fresh charge of the oxid is added as required from time to time, to maintain the necessary concentration.

Instead of using oxid of the desired metal for the reactions, I may use sulfid. Thus, in the treatment of iron, I may use iron sulfid instead of iron oxid.

My invention provides a method of obtaining substantially pure metals from impure oxids, or other compound of the metal, at a relatively low cost. A large number of metals form salts with calcium, which are capable of treatment in the manner described. Calcium oxid can be obtained at a relatively low cost and is of special advantage in carrying out my invention by reason of its high boiling point and high heat of formation.

By the term "calcium salt of a metal", as used herein and in the appended claims, I refer to a salt of calcium having calcium only as its base, and not to a double salt which contains calcium and some other base.

I claim:

1. The herein described method of obtaining a metal from a compound thereof, which consists in forming a calcium salt of the metal and electrolyzing such salt in a fused condition, with a compound of the metal present in the fused bath, substantially as described.

2. The herein described method of obtaining a metal from a compound thereof, which consists in heating an oxid of the metal with calcium oxid in an electric furnace to thereby form a calcium salt of the metal, adding oxid of metal to the fused bath, and electrolyzing the bath in a state of fusion, substantially as described.

3. The herein described method of obtaining a metal from a compound thereof, which consists in heating an oxid of the metal with a calcium compound in an electric furnace to thereby produce a calcium salt of the metal, maintaining such salt in a state of fusion in the furnace, supplying additional compound of the metal, and electrolyzing the fused salt, substantially as described.

4. The herein described method of obtaining a metal from an impure oxid thereof, which consists in forming a calcium salt of the metal and electrolyzing such salt in a fused condition, with oxid of the metal added to the fused bath, substantially as described.

5. The herein described method of obtaining a metal from an oxid thereof, which consists in heating an oxid of the metal with calcium oxid in an electric furnace to thereby form a calcium salt of the metal, adding oxid of metal to the fused bath, and electrolyzing the bath in a state of fusion, substantially as described.

6. The herein described method of obtaining a metal from an oxid thereof, which consists in heating an oxid of the metal with calcium oxid in an electric furnace to thereby produce a calcium salt of the metal, maintaining such salt in a state of fusion in the furnace, supplying additional oxid of the metal, and electrolyzing the fused salt, substantially as described.

In testimony whereof, I have hereunto set my hand.

JOHN WOODS BECKMAN.

Witnesses:
   GEO. H. PARMELEE,
   H. M. CORWIN.

It is hereby certified that in Letters Patent No. 973,336, granted October 18, 1910, upon the application of John Woods Beckman, of Niagara Falls, Ontario, Canada, for an improvement in "Methods of Producing Metal Salts and Metals," errors appear in the printed specification requiring correction as follows: Page 2, lines 7 and 15, the words "an oxid" should read *a compound;* same page, line 10, the words "oxid of metal" should read *a compound of the metal;* same page, line 16, the words "a calcium compound" should read *calcium oxid;* and that the said Letters Patent should be read with these corrections therein that the same may conform to the record of the case in the Patent Office.

Signed and sealed this 27th day of June, A. D., 1911.

[SEAL.]

C. C. BILLINGS,
*Acting Commissioner of Patents.*